Dec. 1, 1953           A. F. TURNER           2,660,925
LIGHT REFLECTOR WHICH TRANSMITS INFRARED RAYS
Filed Dec. 1, 1949
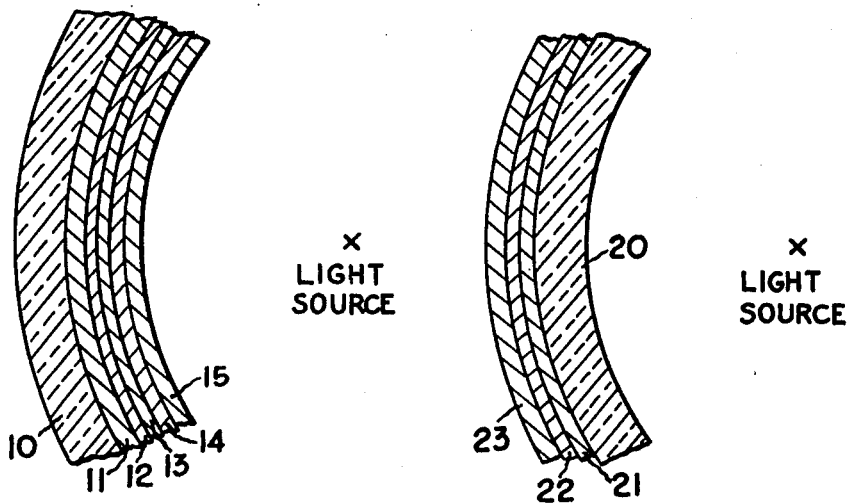
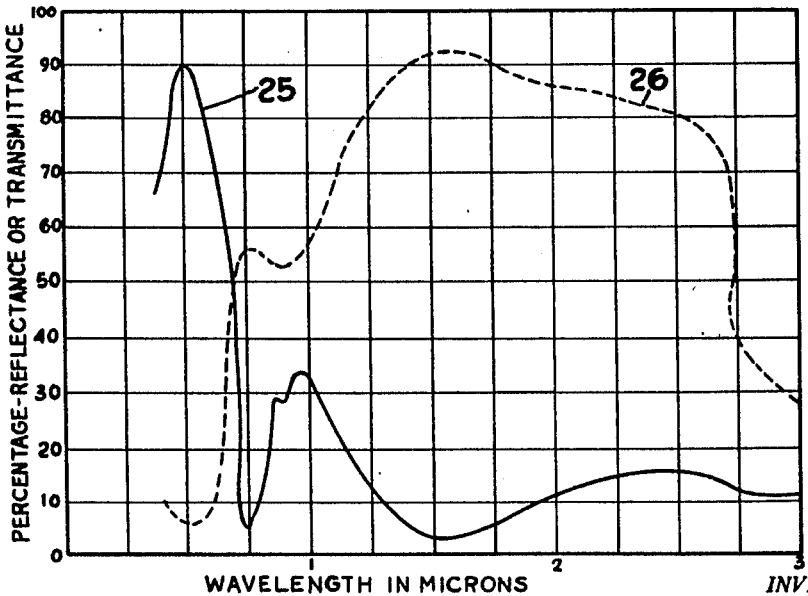
INVENTOR.
ARTHUR F. TURNER
BY
*G. A. Ellestad*
ATTORNEY Patented Dec. 1, 1953

2,660,925

UNITED STATES PATENT OFFICE 2,660,925

LIGHT REFLECTOR WHICH TRANSMITS INFRARED RAYS

Arthur F. Turner, Brighton, N. Y., assignor to Bausch & Lomb Optical Company, Rochester, N. Y., a corporation of New York Application December 1, 1949, Serial No. 130,519

10 Claims. (Cl. 88—105)

This invention relates to light reflectors and more particularly it has reference to reflectors which are used for directing or concentrating light rays which emanate from a light source.

In various types of projectors such, for example, as those embodied in motion picture machines, the light rays from a source, such as an electric arc, are directed and concentrated by concave reflectors which may be spherical or aspherical. In some motion picture machines the light rays are concentrated at the film gate so as to illuminate the film. While it is desirable to have a bright image on the projection screen, such a condition requires the use of a high intensity arc lamp. Since both the heat rays and the visible light rays are reflected by the reflector, the film gate region becomes quite hot. Due to the fact that an increase in the amount of light projected also means an increase in the heat rays projected, the brightness of the source cannot be increased beyond the point where the projected heat rays will injure the film at the gate.

One of the objects of my invention is to provide for light projectors a reflector which will reflect a maximum amount of visible light rays with a minimum amount of infra red rays. A further object is to provide a reflector which is characterized by a metallic reflection in the visible range of the spectrum but which transmits a substantial amount of infra red rays. Another object is to provide a reflector which will reflect a maximum amount of the visible light rays while transmitting a maximum amount of the infra red rays.

These and other objects and advantages reside in certain novel features of construction, arrangement and combination of parts as will hereinafter be more fully described and pointed out in the appended claims.

Referring to the drawings:

Fig. 1 is an enlarged sectional view of a reflector embodying my invention.

Fig. 2 is a similar view of a modification.

Fig. 3 is a chart showing the reflectance of the visible rays and the transmittance of the heat rays by a reflector embodying this invention.

A preferred embodiment of my invention is shown diagrammatically in Fig. 1 wherein 10 indicates a base which is formed of any suitable material, such as glass or quartz, which has a low reflectivity for infra red rays and transmits a relatively large amount of such rays. Deposited on the polished concave surface of the base 10 is a semi-transparent layer 11 which is a good reflector for visible light rays when compared to the base and which has a relatively high transmission and low reflectivity for infra red rays. Very good results have been obtained with a germanium reflecting layer 11 which was deposited by thermal evaporation and has a thickness such that it will transmit about 1%–30% of the light rays of about 435 millimicrons which are incident upon it.

In order to increase the reflectivity of layer 11 for the visible light rays, two pairs of superposed films are deposited on the layer 11. The films 12, 13, 14, and 15 may be deposited by any appropriate method such as thermal evaporation in vacuum. The films 12 and 14, having the lower refractive index, may be formed of any suitable material such as magnesium fluoride or other metallic fluorides and the films 13 and 15, having the higher refractive index may be formed of such materials as zinc sulphide, aluminum oxide, titanium oxide or tin oxide. With respect to refractive index requirements, it is necessary that film 12 have a lower refractive index than film 13 and that film 14 have a lower index than films 13 and 15. It is not necessary that films 12 and 14 have the same index nor that films 13 and 15 have the same index. Each of the films has an optical thickness of the order of ¼ wave length of light rays in the spectral region of about 500–600 millimicrons. Since most of the infra red rays are transmitted through the reflector, only a very little of the infra red rays is reflected or absorbed by the reflector.

The reflector shown in Fig. 1 is a so-called "first-surface" reflector since the reflecting layer is deposited on the side of the glass which will be adjacent the light source when in use. In this type of reflector, the exposed thin film 15 may be covered by a thin half-wave protective layer of a material, such as silicon monoxide, which will transmit substantially all of the visible and infra red rays which are incident thereon.

In Fig. 2 there is shown a modified reflector in which the glass base 20 has a polished convex surface on which is deposited a ¼ wave length film of material 21 on which is deposited another ¼ wave length film of different material 22 with the film 21 having a higher refractive index than either film 22 or the glass base 20. A reflecting layer 23 of germanium is deposited on film 22 and a protective coating of a material, e. g. a lacquer, which transmits a substantial amount of infra red rays, may be applied to the exposed layer 23. This type of reflector is known as a "second-surface" reflector since the glass base is positioned between the light source and the reflecting layer 23.

The efficacy of my improved reflector was clearly demonstrated by comparative tests which were made with a second surface silvered elliptical reflector of the prior art and an elliptical reflector of comparable size which embodied the structure of Fig. 1. A high intensity arc lamp was used with each reflector and the concentrated light rays were projected through a conventional lens system and onto a screen. Measurements made, at the central portion of the projected light area on the screen, showed that for the same illumination on the screen the quantity of heat projected by a reflector embodying this invention was about 35% less than the amount of heat projected by the conventional silvered reflector of the prior art. Or, expressed in another way, if the relative heat per unit of projected light is taken as 100 for a prior art second-surface silvered reflector, the relative heat per unit of light projected with my improved reflector is only about 65.

In another comparison test made in a motion picture machine it was found that for a constant film gate temperature of 1350° F., the conventional silvered reflector projected illumination onto the screen of 600 foot candles whereas with a comparable size reflector embodying my invention a total illumination of 900 foot candles could be projected onto the screen. Hence, for a given film gate temperature, my improved reflector will provide about 50% more screen illumination than would be provided by the reflectors of the prior art.

The chart of Fig. 3 shows the reflectance and transmittance curves of a reflector which embodies the invention and is formed of a layer of germanium (transmitting 17% at 440 millimicrons) and two superposed pairs of low-high index films. The solid line curve 25 shows the reflectance in the visible region and the dash line curve 26 shows the transmittance in the infra red region.

While I have described the reflecting layers 11 and 23 as being formed of germanium, my invention is not restricted to the use of this material. The reflecting layers 11 and 23 could be formed of either germanium, silicon, stibnite, or selenium. All of these materials are characterized by a "metallic reflection" in the visible range of the spectrum followed by a relatively great transparency in the infra red. "Metallic reflection" is defined as a luster characteristic of metals in a compact state, and shown also by some other substances, as certain minerals and dyes. We include under the term "metallic reflection," all cases in which the greater portion of the incident light is returned, in consequence of the absorptive power of the medium.

The reflecting layers 11 and 23 are formed of materials which have a relatively high transmission for the infra red or heat rays. The reflecting layers should also have the highest possible reflectivity for visible light rays. The reflectivity of the layer for visible light rays is increased by employing at least one, but preferably two or more, pairs of low-high index ¼ wave films. The reflecting layers and the ¼ wave films are preferably deposited by thermal evaporation in a vacuum. The films may be heat treated, if desired, to increase tenacity and improve optical properties.

Various modifications can obviously be made without departing from the spirit of my invention as pointed out in the appended claims.

I claim:

1. A reflector for light projectors for reflecting a maximum amount of the visible light rays while transmitting through the reflector a maximum amount of infra red rays which emanate from the light source of the projector, said reflector comprising a glass base having concave polished surface, a semi-transparent reflecting layer of germanium deposited on said surface, said layer transmitting about 1%–30% of the light rays having a wave length of 435 millimicrons which are incident upon the layer, and means on the layer for increasing its reflectivity for visible light rays, said means comprising four superposed films of material deposited on the surface of the germanium layer which faces the light source, the first film being deposited on the germanium layer, the first and third films being formed of magnesium fluoride, the second and fourth films being formed of zinc sulphide, each of said films having an optical thickness substantially of the order of ¼ wave length of light rays in the spectral region of about 500–600 millimicrons.

2. A reflector for light projectors comprising a semi-transparent reflecting layer of a material which transmits a substantial amount of infrared rays and reflects a substantial amount of white light so that visible rays from a light source may be reflected onto a film gate and the infrared rays from the source will be transmitted through the reflecting layer and thereby reduce the amount of heat at the film gate, said layer being characterized by a metallic reflection in the visible range of the spectrum, said layer being formed of a material selected from the group consisting of germanium, silicon, selenium and stibnite, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

3. A reflector for light projectors comprising a semi-transparent reflecting layer of a material which transmits a substantial amount of infrared rays and reflects a substantial amount of white light so that visible rays from a light source may be reflected onto a film gate and the infrared rays from the source will be transmitted through the reflecting layer and thereby reduce the amount of heat at the film gate, said layer being characterized by a metallic reflection in the visible range of the spectrum, said layer being formed of a semi-transparent layer of germanium, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

4. A reflector for light projectors comprising a semi-transparent reflecting layer of a material which transmits a substantial amount of infra-red rays and reflects a substantial amount of white light so that visible rays from a light source may be reflected onto a film gate and the infra-red rays from the source will be transmitted through the reflecting layer and thereby reduce the amount of heat at the film gate, said layer being characterized by a metallic reflection in the visible range of the spectrum, said layer being formed of a semi-transparent layer of silicon, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

5. A reflector for light projectors comprising a semi-transparent reflecting layer of a material which transmits a substantial amount of infra-red rays and reflects a substantial amount of white light so that visible rays from a light source may be reflected onto a film gate and the infra-red rays from the source will be transmitted through the reflecting layer and thereby reduce the amount of heat at the film gate, said layer being characterized by a metallic reflection in the visible range of the spectrum, said layer being formed of a semi-transparent layer of selenium, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

6. A reflector for light projectors comprising a semi-transparent reflecting layer of a material which transmits a substantial amount of infra red rays and reflects a substantial amount of white light so that visible rays from a light source may be reflected onto a film gate and the infra red rays from the source will be transmitted through the reflecting layer and thereby reduce the amount of heat at the film gate, said layer being characterized by a metallic reflection in the visible range of the spectrum, said layer being formed of a semi-transparent layer of stibnite, and means on the layer for increasing the reflectivity of the layer for visible rays, said means comprising at least one pair of superposed films of material deposited on the surface of the layer which faces the light source, each of said films being formed of a different material having respectively different refractive indices, the lower index film of each pair having a refractive index lower than that of all films adjacent to it, the film in contact with the layer having a lower index than its adjacent film, each of said films having an optical thickness which is substantially of the order of ¼ wave length of light rays in the spectral region of about 500–600 millimicrons.

7. A reflector having the structure recited in claim 3 in which the reflecting layer transmits about 1%–30% of the light rays having a wave length of about 435 millimicrons which are incident upon the layer.

8. A reflector having the structure recited in claim 3 in which the film next to the layer is formed of magnesium fluoride and the other film of the pair is formed of zinc sulphide.

9. A reflector having the structure recited in claim 3 and a rigid base for supporting the layer and films, said base being formed of a material which transmits a substantial amount of infra red rays.

10. A reflector having the structure recited in claim 2 and a rigid glass base for supporting the layer and films.

ARTHUR F. TURNER.

References Cited in the file of this patent

UNITED STATES PATENTS

| Number | Name | Date |
|---|---|---|
| 1,342,894 | Bugbee | June 8, 1920 |
| 1,425,967 | Hoffman | Aug. 15, 1922 |
| 2,379,790 | Dimmick | July 3, 1945 |
| 2,394,533 | Colbert et al. | Feb. 12, 1946 |
| 2,412,496 | Dimmick | Dec. 10, 1946 |
| 2,495,499 | Amon | Jan. 24, 1950 |
| 2,519,722 | Turner | Aug. 22, 1950 |

FOREIGN PATENTS

| Number | Country | Date |
|---|---|---|
| 716,153 | Germany | Dec. 8, 1939 |

OTHER REFERENCES

Journal of the Optical Society of America, vol. 37, No. 6. June 1947, pages 451 through 465.